(12) United States Patent
Thakore et al.

(10) Patent No.: US 12,346,610 B2
(45) Date of Patent: Jul. 1, 2025

(54) VIRTUAL QUEUE FOR MESSAGES

(71) Applicant: Beijing Tenafe Electronic Technology Co., Ltd., Beijing (CN)

(72) Inventors: Priyanka Nilay Thakore, Mountain View, CA (US); Chen Xiu, Beijing (CN); Zhikai Chen, Shanghai (CN); Lyle E. Adams, San Jose, CA (US)

(73) Assignee: Beijing Tenafe Electronic Technology Co., Ltd. (CN)

( * ) Notice: Subject to any disclaimer, the term of this patent is extended or adjusted under 35 U.S.C. 154(b) by 0 days.

(21) Appl. No.: 18/537,300

(22) Filed: Dec. 12, 2023

(65) Prior Publication Data

US 2024/0111460 A1    Apr. 4, 2024

Related U.S. Application Data

(63) Continuation of application No. 18/195,518, filed on May 10, 2023, now Pat. No. 11,899,984.

(60) Provisional application No. 63/392,259, filed on Jul. 26, 2022.

(51) Int. Cl.
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 6,735,211 B1 | 5/2004 | Karasawa | |
| 8,332,473 B1 | 12/2012 | Fouts | |
| 8,407,707 B2 | 3/2013 | Sonnier | |
| 8,949,474 B1 | 2/2015 | Swarbrick | |
| 9,760,281 B2 | 9/2017 | Ramalingam | |
| 10,178,033 B2 * | 1/2019 | Bellessa | H04L 63/1458 |
| 11,366,690 B2 * | 6/2022 | Xiao | G06F 9/4881 |
| 11,645,011 B2 | 5/2023 | Lee | |
| 11,646,980 B2 | 5/2023 | Chilikin | |
| 11,646,987 B1 | 5/2023 | Pathak | |

(Continued)

FOREIGN PATENT DOCUMENTS

| | | |
|---|---|---|
| CN | 102597971 | 7/2012 |
| CN | 105612502 | 5/2016 |
| CN | 113836057 | 12/2021 |

*Primary Examiner* — Elias Mamo
(74) *Attorney, Agent, or Firm* — Van Pelt, Yi & James LLP

(57) ABSTRACT

A storage controller system includes a host command module that manages communication with a host and a backend command module that manages communication with a storage system. A storage interface hardware functional module, in response to an unsuccessful or successful operation, generates a first or second type of a status message with an automated retry flag set to TRUE or FALSE. A virtual queue module receives the status message and selects a virtual queue. If (1) the flag being set to TRUE and (2) independent of the queue ID, an original command virtual queue is selected. If (1) the flag being set to FALSE and (2) the queue ID being set to the value associated with the backend command module, a virtual queue associated with the backend command module is selected. A stored message in the selected virtual queue is provided to the selected message recipient.

6 Claims, 8 Drawing Sheets

(56) References Cited

U.S. PATENT DOCUMENTS

| | | | |
|---|---|---|---|
| 11,899,984 B1* | 2/2024 | Thakore | G06F 3/0679 |
| 2004/0187089 A1 | 9/2004 | Schulz | |
| 2009/0122703 A1* | 5/2009 | Gangwal | H04L 47/10 |
| | | | 370/235 |
| 2015/0169406 A1 | 6/2015 | Li | |
| 2017/0093770 A1 | 3/2017 | Flajslik | |
| 2018/0210845 A1* | 7/2018 | Jafri | G06F 13/1642 |
| 2019/0097800 A1 | 3/2019 | Melrose | |
| 2019/0258919 A1 | 8/2019 | Lie | |
| 2019/0258920 A1 | 8/2019 | Lie | |
| 2022/0334770 A1 | 10/2022 | Guo | |
| 2024/0089196 A1 | 3/2024 | Thota | |

\* cited by examiner

VIRTUAL QUEUE FOR MESSAGES

CROSS REFERENCE TO OTHER APPLICATIONS

This application is a continuation of U.S. patent application Ser. No. 18/195,518 entitled VIRTUAL QUEUE FOR MESSAGES filed May 10, 2023 which is incorporated herein by reference for all purposes, which claims priority to U.S. Provisional Patent Application No. 63/392,259 entitled VIRTUAL QUEUE FOR COMMAND AND STATUS MESSAGES filed Jul. 26, 2022 which is incorporated herein by reference for all purposes.

BACKGROUND OF THE INVENTION

Some System on Chip (SOC) products interface with a variety of devices and/or are included in a variety of systems. For example, a storage controller (e.g., which sits between a host and storage media) may be implemented on an SOC and may be designed to interface with a variety of storage media from different manufacturers. Improved SOC systems which offer flexibility (e.g., to interface with a variety of devices and/or be included in a variety of systems) but without some of the drawbacks associated with existing SOC systems would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
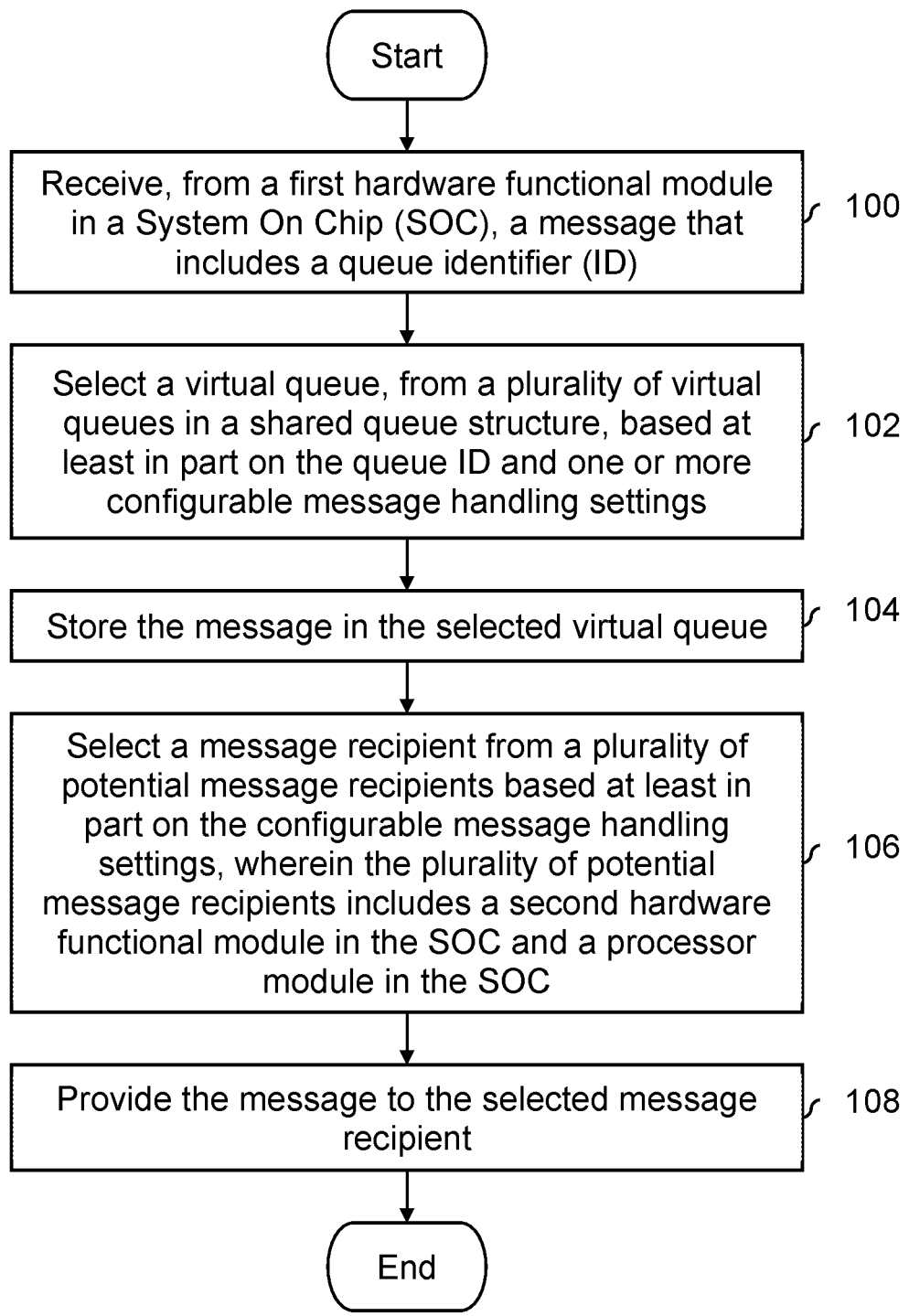
FIG. 1 is a flowchart illustrating an embodiment of a process to exchange messages using a virtual queue.

Various embodiments of techniques for using a virtual queue module in a System On Chip (SOC) are described herein. In some embodiments, the virtual queue module acts as a (e.g., configurable) isolation layer between processor modules and hardware functional modules in a System On Chip (SOC). In some embodiments, the virtual queue module includes a message manager that uses configurable message handling settings to decide (as an example) which virtual queue to store a (e.g., incoming or received) message in, any modifications to perform on a (e.g., stored) message (e.g., before the message is passed along to a recipient), and/or determine or otherwise identify which recipient a message is intended for. In various embodiments, the configurable message handling settings are changed during runtime (e.g., to adjust to actual operating conditions), or during an initialization process (e.g., for multi-purpose or multi-application SOC, depending upon the application and/or larger system in which the SOC is used). FIG. 1 describes one embodiment of the processing performed by such a virtual queue module.

FIG. 1 is a flowchart illustrating an embodiment of a process to exchange messages using a virtual queue. In this example, the process is performed by a virtual queue module in a System On Chip (SOC). For example, one or more processor modules and two or more hardware functional modules may be connected to the virtual queue module and the virtual queue module is used to exchange messages amongst the processor module(s) and the hardware functional modules.

At 100, a message that includes a queue identifier (ID) is received from a first hardware functional module in a System On Chip (SOC). In various embodiments, a message received at step 100 is a command message (e.g., to command or instruct the target to perform some task or process) or a status message (e.g., of a hardware functional module or other entity that generated the message, generated in response to completion of a task or process and/or in response to a command to generate a status message).

As used herein, the term "hardware functional module" is used to refer to a module in the SOC that is implemented in hardware (e.g., an application-specific integrated circuit (ASIC) or field-programmable gate array (FPGA)). In one example, the hardware functional module has completed a task or operation and the message is a status or state message that is generated or sent in response to completion of the task or operation (e.g., the message includes the status or state of the hardware functional module, an output of the hardware functional module, a pointer or link to such an output, etc.).

At 102, a virtual queue is selected from a plurality of virtual queues in a shared queue structure based at least in part on the queue ID and one or more configurable message handling settings. The configurable message handling settings include a variety of settings, including (in one example) a queue ID to virtual queue mapping (i.e., message collection settings, describing where messages are collected or otherwise stored), a transformation or modification of the message (i.e., message modification settings), and a virtual queue to message recipient mapping (i.e., message routing settings). These message handling settings are configured and can be changed as desired or needed (e.g., to accommodate processor module loads, hardcoded errors in a hardware functional module, etc.).

In some embodiments, the shared queue structure includes a (e.g., single) SRAM and the plurality of virtual queues are all stored on the (e.g., single) SRAM. In some embodiments, the virtual queues have different lengths (sizes). In some embodiments, the length (size) of a given virtual queue can be changed on the fly.

At 104, the message is stored in the selected virtual queue.

At 106, a message recipient is selected from a plurality of potential message recipients based at least in part on the configurable message handling settings, wherein the plurality of potential message recipients includes a second hardware functional module in the SOC and a processor module in the SOC. In some embodiments, a processor module is a microprocessor or an embedded processor in an SOC. In some embodiments, firmware runs on the processor module in the SOC.

At 108, the message is provided to the selected message recipient. In various embodiments, the message is pulled from the virtual queue module by the message recipient or is pushed out to the message recipient from the virtual queue module. For example, the selected message recipient may be notified and in response to the notification, the selected message recipient pulls the message from the plurality of virtual queues (e.g., more specifically, from whichever virtual queue the message is stored in).

In some embodiments where the message has been moved to a second virtual queue (e.g., after being initially stored in a first virtual queue), the message is pulled (or more generally, is provided) from the second virtual queue. Similarly, in some embodiments where the message is modified, the modified message is provided at step 108.

Conceptually, a virtual queue module (e.g., which includes the virtual queues, a message manager, and one or more configurable message handling settings) acts as an (e.g., configurable) isolation layer between the processor modules and hardware functional modules. That is, messages cannot be sent directly from a first hardware functional module to a second hardware functional module without passing through the virtual queue module. Similarly, messages cannot be sent directly from processor module to processor module (without first passing through the virtual queue module), nor can messages be passed directly from processor module to hardware functional module (or vice versa) without passing through a virtual queue module.

To appreciate the benefits of an (e.g., intervening) virtual queue module, it may be helpful to consider other systems that do not include virtual queue modules. The following figures illustrate some such examples.

Figure 2:
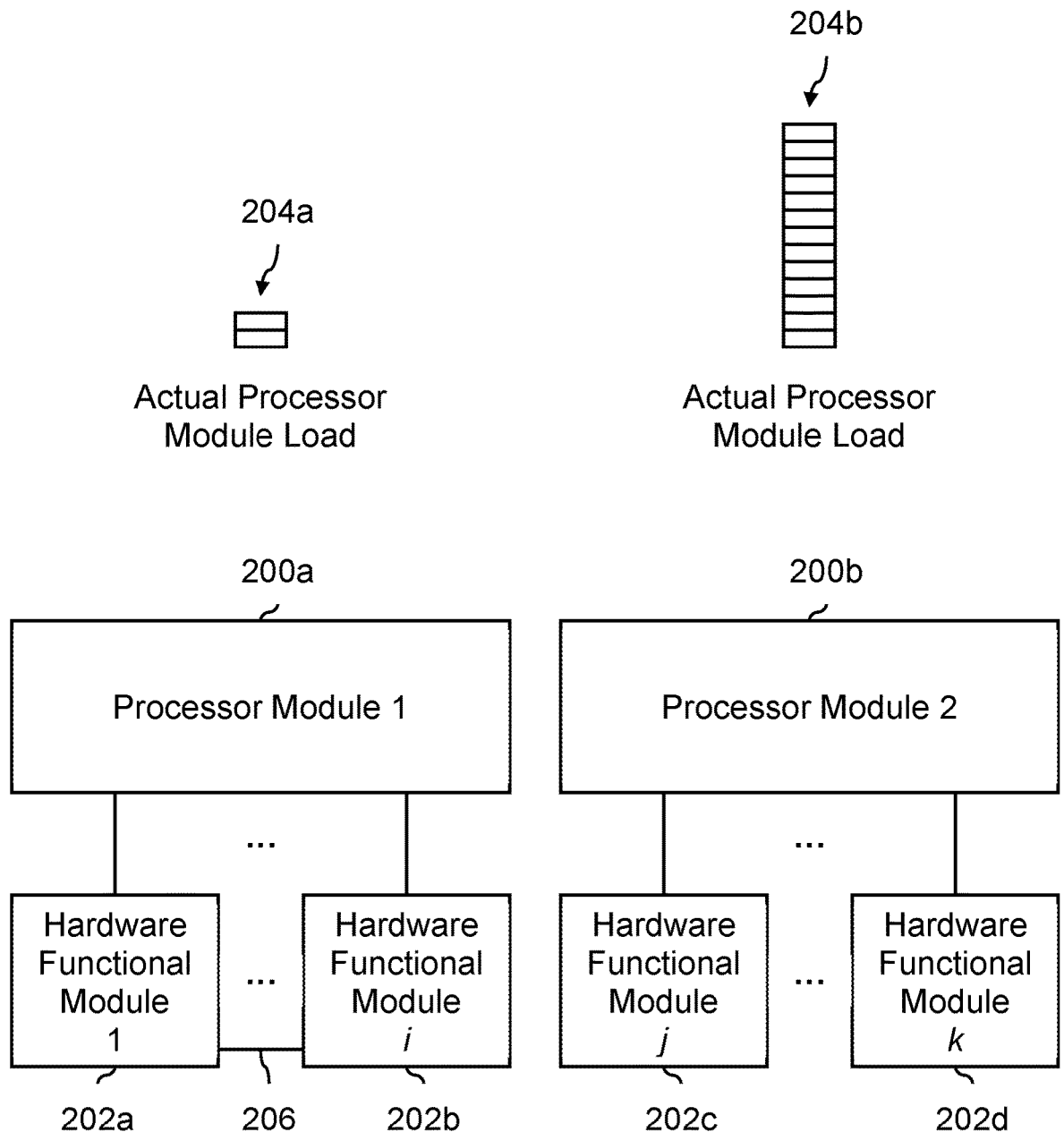
FIG. 2 is a diagram illustrating a first example of a system that does not use virtual queues between central processing units (processor modules) and functional modules.

FIG. 2 is a diagram illustrating a first example of a system that does not use virtual queues between central processing units (processor modules) and functional modules. In this example, the system includes two central processing units (processor modules): processor module 1 (200a) and processor module 2 (200b). In general, the processor modules (200a and 200b) perform the decision making in this example. In some embodiments, firmware is running on the processor modules.

The exemplary system shown here also includes multiple functional modules (202a-202d). The functional modules (202a-202d) perform a variety of operations and/or functions, in general under the guidance and/or direction of the processor modules (200a and 200b). For example, a processor module may direct where data should move or go to next and/or decide what should be a first step and/or operation, what should be a second step and/or operation, and so on. In general, a functional module will be triggered or otherwise initiated by a processor module and when the given functional module has completed its task and/or operation, the functional module will send a COMPLETED or DONE indication back to the initiating processor module. The processor module will then initiate the next step with the appropriate functional module.

In this example, the connections between the processor modules (200a and 200b) and the functional modules (202a-202d) are fixed or otherwise hard coded. Processor module 1 (200a) is connected to and manages functional modules 1-i (202a-202b) and processor module 2 (200b) is connected to and manages functional modules j-k (202c-202d).

One disadvantage of this configuration is that the actual processor module load (204a and 204b) may not match an anticipated processor module load that was used to group and/or connect the processor modules (200a and 200b) and functional modules (202a-202d). For example, the actual processor module load (204b) for processor module 2 (200b) is relatively high whereas the actual processor module load (204a) for processor module 1 (200a) is relatively low. However, because the connections between the processor modules (200a and 200b) and functional modules (202a-202d) are fixed and/or hard coded, the functional modules that are connected to and/or managed by a given processor module cannot be reassigned and/or redistributed.

The following figure shows an example of another type of system (which also does not use virtual queues) that attempts to address the shortcomings described above but which has its own disadvantages.

Figure 3:
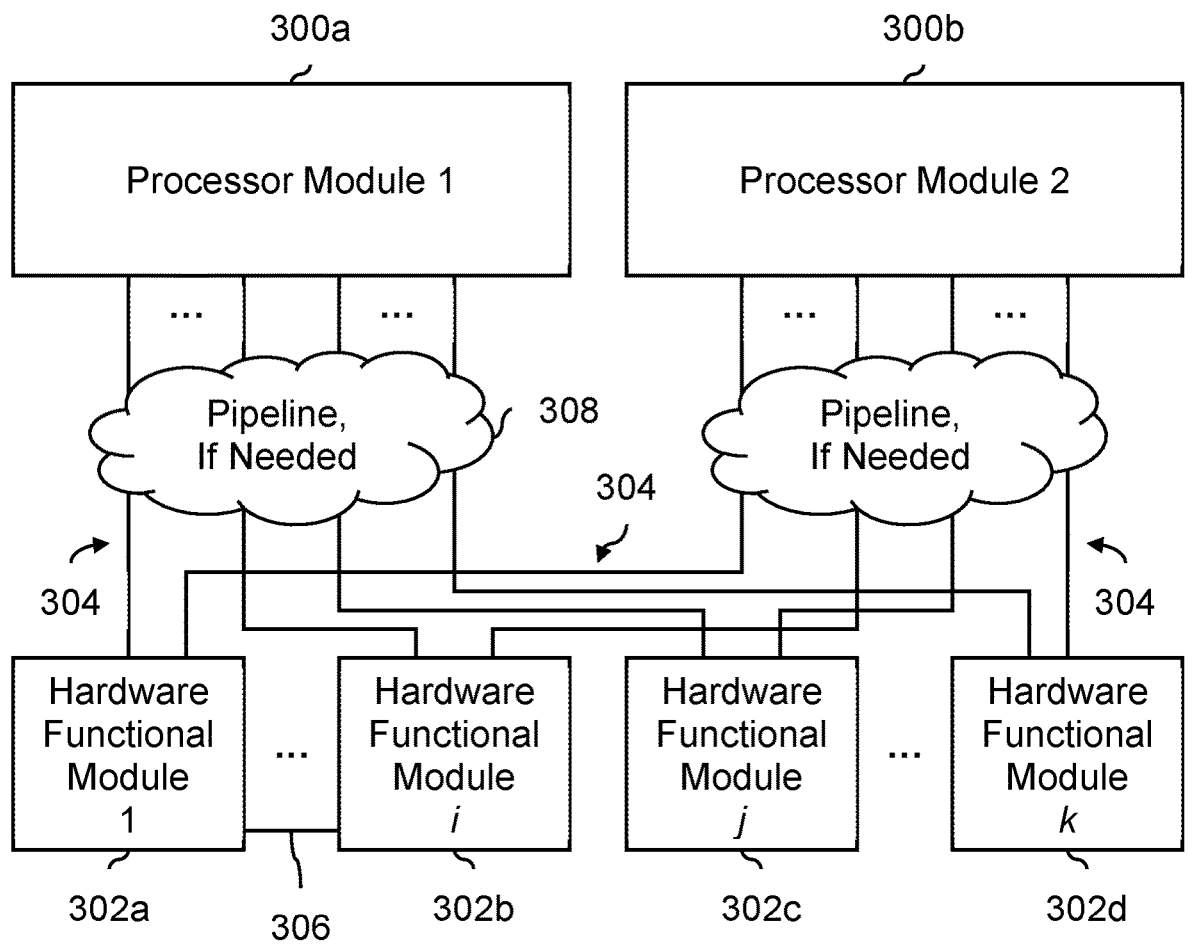
FIG. 3 is a diagram illustrating a second example of a system that does not use virtual queues between processor modules and functional modules.

FIG. 3 is a diagram illustrating a second example of a system that does not use virtual queues between processor modules and functional modules. In this example, all of the processor modules (300a and 300b) are connected to all of the functional modules (302a-302d). For example, processor module 1 (300a) has a connection to functional modules 1-i (302a-302b) as well as functional modules j-k (302c-302d). Similarly, processor module 2 (300b) has a connection to each one of functional modules 1-k (302a-302d).

While this system is able to change which functional modules are managed by and/or grouped with a given processor module, the disadvantage of this system is the significant amount of interconnection (304), which makes routing on an ASIC or FPGA difficult (e.g., due to routing congestion) and/or expensive (e.g., due to increased die size associated with the significant amount of routing).

Yet another disadvantage (which is common to both of the example systems shown in FIGS. 2 and 3) is that if a direct hardware functional module to hardware functional module connection is desired (e.g., because an intervening (decision by a) processor module between two functional modules is not needed), such a connection would be formed using fixed and/or hard-coded connections (e.g., 206 in FIGS. 2 and 306 in FIG. 3) between a first functional module and a second functional module. If a new direct connection between functional module and functional module is desired (e.g., to support a new device being interfaced requires different decision making and/or a different flow of data), then a new (e.g., ASIC or FPGA) product would need to be designed and manufactured to support the new direct connection(s). If direct hardware functional module to hardware functional module connectivity that is adjustable is desired, then each hardware functional module will need routing to each other hardware functional module (e.g., 306), which will add significantly to the routing area consumed (and correspondingly cause the die size and cost to also increase).

In contrast, a system that uses virtual queues offers flexibility but without the drawbacks described above. The following figure shows such an example system that uses virtual queues and illustrates some associated advantages.

Figure 4:
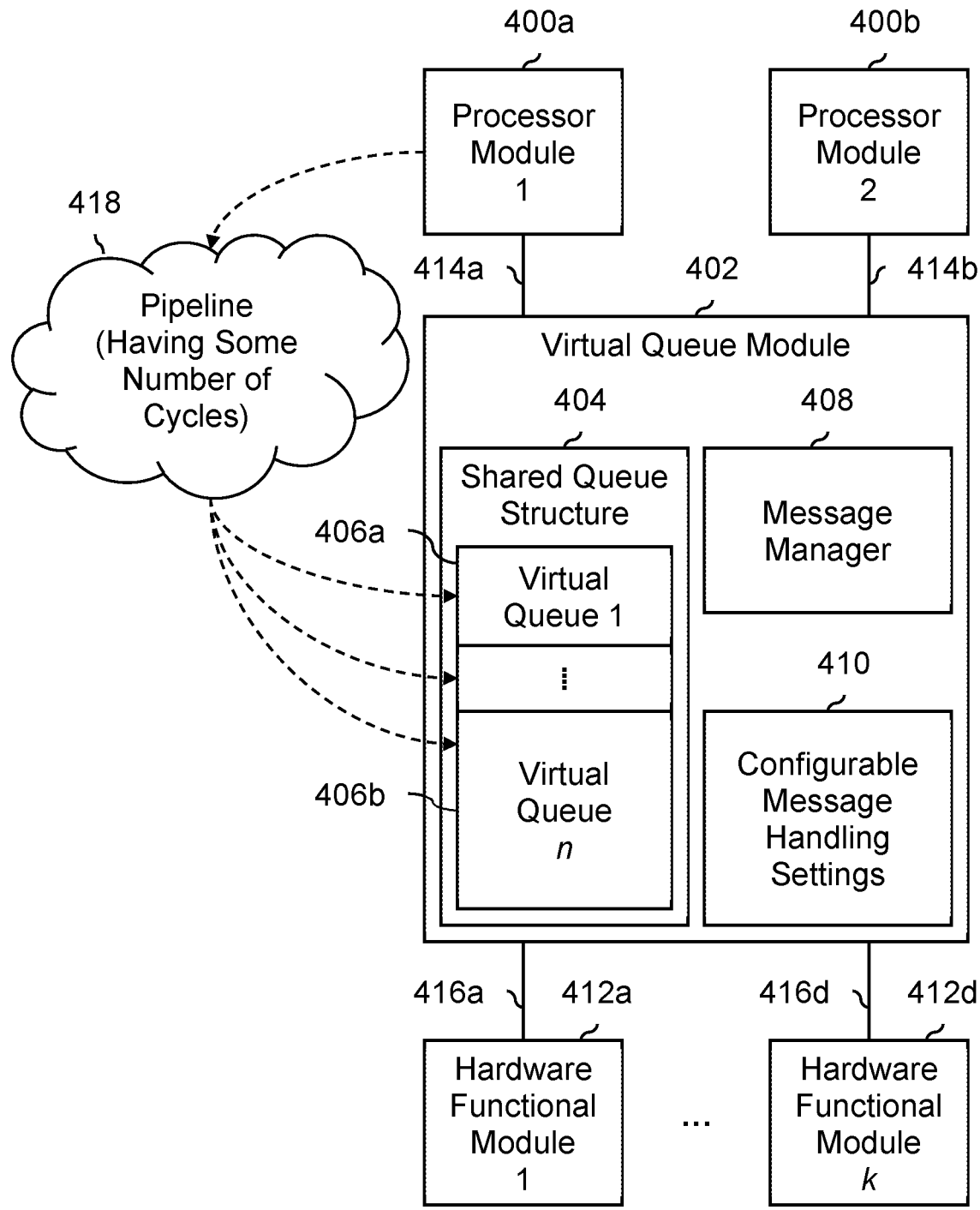
FIG. 4 is a diagram illustrating an embodiment of a virtual queue that is used to store and exchange messages amongst processor modules and hardware functional modules.

FIG. 4 is a diagram illustrating an embodiment of a virtual queue that is used to store and exchange messages amongst processor modules and hardware functional modules. In this example, the virtual queue module (402) includes a message manager (408) which stores and generally manages the messages (e.g., from one of the processor modules (400a and 400b) or one of the hardware functional modules (412a-412d)) passing through the virtual queue module (402) according to the configurable message handling settings (410) and the metadata and/or payload within a message. For example, the configurable message handling settings (410) may include settings that control which virtual queue a message is stored in, any modifications to a (e.g., stored) message (e.g., before the message is passed on), and/or the recipient of the message (e.g., based on a message's queue ID, other message metadata, and/or message payload).

The virtual queue module (402) also includes a shared queue structure (404) with n virtual queues (406a-406b). In this example, the shared queue structure (404) is a single storage device, for example, so that the same and/or shared routing (e.g., to or from the shared queue structure (404)) can be used between a virtual queue and a source device (e.g., one of the processor modules (400a and 400b) or one of the hardware functional modules (412a-412d)), or a destination device (e.g., one of the processor modules (400a and 400b) or one of the hardware functional modules (412a-412d)), regardless of which specific virtual queue is used or otherwise selected to store a message. As described above, in some embodiments, the shared queue structure (404) is an SRAM.

As shown in this example, the sizes of the virtual queues are not necessarily the same. For example, in FIG. 4, the size of the $n^{th}$ virtual queue (406b) is larger than the first virtual queue (406a). In some embodiments, the sizes of the virtual queues are adjustable in real-time (e.g., where the configurable message handling settings (410) record the locations within the shared queue structure (404) that are associated with or otherwise belong to a particular virtual queue).

In some embodiments, when a larger queue size is desired, the target queue ID is changed to that of a larger-sized queue (e.g., instead of expanding the currently targeted queue so that the targeted queue has fragmented and/or non-contiguous locations in memory). In some applications, this reassignment approach is preferred over the expansion approach because it is simpler and/or optimizes the design.

The virtual queue module (402) is connected to two processor modules (400a and 400b), as well as k hardware functional modules (412a-412d). It is noted that the number of processor modules and hardware functional modules shown in this example are merely exemplary and the techniques described herein apply to other numbers and/or configurations. As described above in FIG. 1, a message may be received from a (first) hardware functional module (e.g., one of 412a-412d) and a virtual queue (e.g., one of 406a-406b) is selected based at least in part on the queue ID in the message and one or more configurable message handling settings (410). The message is stored in the selected virtual queue. A message recipient is selected based at least in part on the configurable message handling settings (410) where the potential message recipients include any of the processor modules (400a and 400b) or the hardware functional modules (412a-412d).

Unlike the system shown in FIG. 2, the example system shown here in FIG. 4 is able to adapt to actual processor module loads that are unexpectedly unequal. For example, if the second processor module (400b) had a much higher actual load compared to the first processor module (400a), then the configurable message handling settings (410) could be adjusted so that different hardware functional modules (412a-412d) are grouped with and/or assigned to different processor modules (400a and 400b).

In one example, the first processor module (400a) has a much heavier load than the second processor module (400b). To more evenly distribute the load, some hardware functional module(s) (412a-412d) could be reassigned to the second processor module (400b). More specifically, this can be achieved by changing the routing of the messages that are exchanged with the reassigned hardware functional module(s) from the first processor module (400a) to the second processor module (400b) (e.g., by changing the configurable message handling settings (410) accordingly); this adjustment to message routing via the virtual queue module (402) would group or otherwise assign those hardware functional module(s) to the second processor module (400b) and reduce the load on the first processor module (400a). To support this, the two processor modules (400a and 400b) may be running identical firmware so that each processor module can perform the functions and/or operations of the other. In contrast, the example system shown in FIG. 2 (which does not use virtual queues) could not be modified mid-operation in this manner.

Another advantage to the exemplary system shown in FIG. 4 is that flexible hardware functional module to hardware functional module connectivity is supported but without the excessive routing required of a "connect everything to everything" approach (see, e.g., FIG. 3). For example, in a storage system, there may be independent layers of encoding (or, more generally, processing) that are applied to data before the data is stored; those layers of encoding may vary depending upon the application. In one example, a storage controller SOC could support both <encoding layer 1> <encoding layer 2> <encoding layer 3> (where for simplicity and ease of explanation, each encoding layer is performed by a different and/or respective hardware functional module in this example) and <encoding layer 1> <encoding layer 3> by having (e.g., output) messages from a first hardware functional module (e.g., that performs <encoding layer 1>) be re-routed (e.g., by modifying the configurable message handling settings accordingly) to a third hardware functional module (e.g., that performs <encoding layer 3>) or to a virtual queue that acts as an input queue to that hardware functional module (e.g., instead of to a second hardware functional module that performs <encoding layer 2> or to a virtual queue that acts as the input queue). This flexibility in a storage controller SOC is desirable because then the same SOC could be used in different products and/or in different storage applications.

Another advantage to the exemplary system shown in FIG. 4 is that it uses less routing compared to the example shown in FIG. 3 where to support a flexible configuration, there is a significant amount of routing (304) between each processor module (300a and 300b) and each hardware functional module (302a-302d). Also, if flexible hardware functional module to hardware functional module connectivity is desired, then there is additional routing between each hardware functional module pair (e.g., 306). In contrast, because the virtual queues (406a-406b) are located in a shared queue structure (404), each of the processor modules (400a and 400b) can have a (e.g., single, shared) connection (414a and 414b) to the virtual queue module (402) that is used regardless of which virtual queue is used for messages to or from a given processor module. Similarly, each of the hardware functional modules (412a-412d) can have a (e.g., single, shared) connection (416a-414d) to the virtual queue module (402) that is used regardless of which virtual queue is used for messages to or from a given hardware functional module. To summarize, flexibility is supported but with less routing (and thus die size and cost are also lower) compared to the example of FIG. 3.

In some embodiments, a virtual queue module (e.g., or more specifically, some controller or manager within the virtual queue module) is (further) configured to modify, during runtime, the configurable message handling settings, based at least in part on a current state of the SOC, so that the size of at least one of the plurality of virtual queues is modified.

For example, suppose that during the design phase of the SOC, simulation of how the SOC would be used is inaccurate, insufficient, or not performed at all. In such situations, the sizes of the virtual queues that (for example) feed or input to firmware (i.e., the processor modules) may not be optimally sized for the best throughput or performance. Changing the sizes of the virtual queues during runtime using the configurable message handling settings enables better performance if design-phase simulation was insufficient or not performed.

In another example scenario where the sizes of the virtual queues are adjusted during runtime, suppose that the SOC is a storage controller that reads from and writes to some storage media. With usage and/or longer data retentions times, some types of storage media degrade (e.g., program and erase operations degrade NAND Flash storage media) and the error rate of readback data will significantly increase. An error correction decoder in the storage controller SOC will require more time to decode read data, and a virtual queue at the input of a decoder may have more messages whereas a virtual queue at the output of the decoder may have fewer messages. Changing the sizes of the virtual queues during runtime using the configurable message handling settings enables more efficient or optimal sizing of the virtual queues.

Returning briefly to the other system shown in FIG. 3, consider the interconnections between the first processor module (300a) and the k hardware functional modules (302a-302d). A disadvantage to systems that do not use a virtual queue module (e.g., FIG. 3) is that typical numbers of hardware functional modules (e.g., in a real-world design) have a much more noticeable negative impact on performance compared to systems that do include virtual queue modules. For example, a cell library may have logically-identical flip flops of varying drive strength: REG1, REG2, REG4, and REG8. If the last cell in the first processor module (300a) is a register or flip flop, that register must have a drive strength that is sufficient to drive the load (in this example, the k hardware functional modules (302a-302d)), or some mitigation must be performed.

One mitigation technique (when the drive strength is insufficient for the load in question) is to reduce the operating frequency, which is undesirable since performance will suffer. An alternate mitigation approach is to add a pipeline stage (e.g., associated with pipeline (308) in FIG. 3) to prevent a decrease in the operating frequency. However, adding pipeline stages has a cost and/or practical limit because adding pipeline stages increases latency (e.g., to and/or from a processor module). In storage applications, this directly lowers the input/output operations per second (IOPS) target in (for example) an SSD storage system so pipeline stage increases are done cautiously.

With a virtual queue module (e.g., FIG. 4), the number of (e.g., physical) components that are driven is reduced, because all of the virtual queues are in a shared queue structure (e.g., a single physical device and/or a single SRAM). The 2-to-k physical links and interconnects shown in FIG. 3 (e.g., between the processor modules (300a and 300b) and the hardware functional modules (302a-302d) are broken. Instead, the virtual queue module (e.g., 402 in FIG. 4) has a shared queue structure (404), which is a 2-to-1 arrangement, and so less mitigation (e.g., in the form of reduced operating frequency and/or pipeline stages) is needed since there is less loading.

In an apples-to-apples comparison, without a virtual queue module (e.g., FIG. 3), one additional pipeline path would need to be added when four more hardware functional modules are added. With a virtual queue module (e.g., FIG. 4), a shared queue structure (e.g., 404) can hold up to 100 virtual queues (e.g., in a single SRAM) and so an additional or second shared queue structure (i.e., additional load) may only need to be added after the first 100 virtual queues have been exhausted. In other words, for the first 100 virtual queues (e.g., which may act as input queues for hardware functional modules and thus corresponds to 100 hardware functional modules), there is no impact on the load and/or number of pipeline stages. In contrast, without a virtual queue module, the addition of hardware functional modules immediately has an impact on the load and resulting number of pipeline stages.

In some embodiments, the maximum number of virtual queues (i.e., the maximum value of n) is limited by the (e.g., desired and/or acceptable) number of pipeline cycles (418) in the system. For simplicity and ease of explanation, an exemplary pipeline (418) is shown here between the first processor module (400a) and the n virtual queues (406a-406b). In actuality, there are other pipelines between other elements in the system, such as between the second processor module (400b) and the n virtual queues (406a-406b), as well as between each of the hardware functional modules (e.g., 412a) and the n virtual queues (406a-406b).

In some applications, it may be undesirable for the number of cycles in pipelines throughout the system (e.g., including pipeline 418 and other pipelines not shown in this diagram) to exceed some (e.g., desirable and/or acceptable) maximum (e.g., there may be diminishing marginal returns as the number of pipeline cycles increases). An acceptable maximum number of pipeline cycles may thus limit the (e.g., maximum) number of virtual queues (i.e., n) that can be supported or otherwise included in the system.

In some embodiments, an acceptable maximum number of pipeline cycles is within a range of 10-20 (e.g., so that all pipelines throughout the system, or at least the critical ones, have at most between 10 cycles and 20 cycles) and the configurable message handling settings (410) are configured so that the number of virtual queues, per the configurable message handling settings, is compatible with (e.g., is not more than can be supported by) the acceptable maximum number of pipeline cycles that is within the range of 10-20. In some applications, having the maximum number of pipeline cycles be between 10 and 20 cycles is an acceptable and/or good tradeoff between the number of virtual queues and the number of pipeline cycles.

The following figures illustrate how the example system shown in FIG. 4 may perform various embodiments of the process of FIG. 1. For ease of explanation, the components shown in FIG. 4 may be grouped or arranged in some other manner in the following figures.

Figure 5:
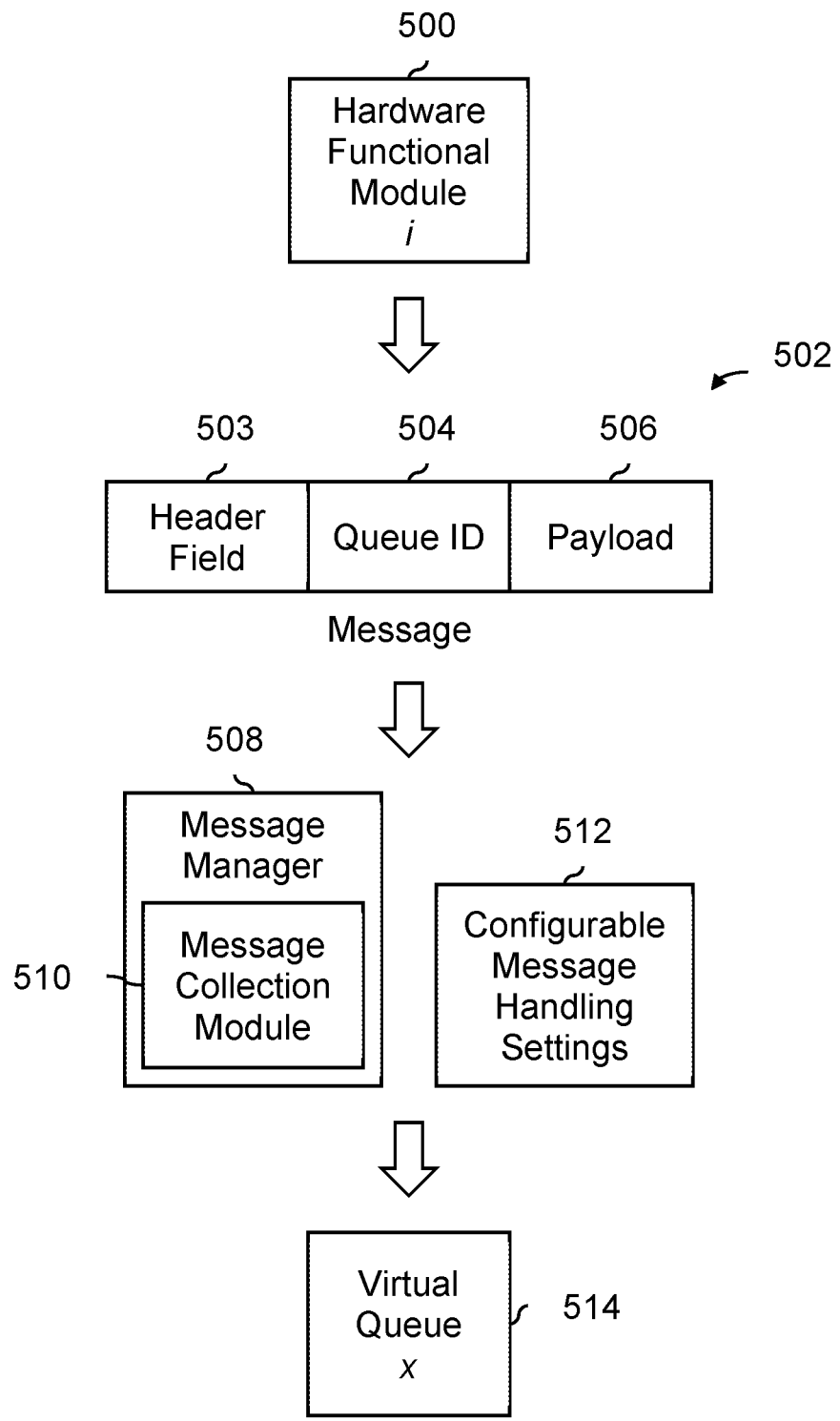
FIG. 5 is a diagram illustrating an embodiment of a message manager storing a message in a selected virtual queue.

FIG. 5 is a diagram illustrating an embodiment of a message manager storing a message in a selected virtual queue. In this example, a hardware functional module (500) generates a message (502) that includes a queue ID (504) and a payload (506). For example, the payload information may include a status of the hardware functional module (500) at the end of the task or processing, output data (i.e., that is output by the hardware functional module), a link where such output data is stored, etc.

The message (502) is passed to a message manager (508) which includes a message collection module (510) which handles incoming messages. The message collection module (510) examines the queue ID (504) in the message (502) and consults the configurable message handling settings (512) to determine or otherwise select which virtual queue (514) to store the received message in. In this example, the virtual queue is selected (e.g., per the configurable message handling settings (512)) based on the queue ID (504), a header field (503), as well as some portion of the payload (506). It is noted that the queue ID (504) may itself be a header field and header field 503 may be some other header field (e.g., that identifies the message type and/or the format of the message).

The message collection module (510) in the message manager (508) then writes or otherwise stores the message (502) in the selected virtual queue (514), in this example the $x^{th}$ virtual queue.

In one example, there is a bug in the SOC where some messages with a certain queue ID and certain message type (e.g., specified by header field (503)) have a wrong and/or insufficient payload (e.g., the wrong status from the wrong register, incomplete output data that only contains some but not all bits of the output data, etc.). Those messages with a payload that needs to be fixed are sent to a "to be fixed" virtual queue (or some other virtual queue). Once moved to that virtual queue, the messages may be modified and then passed along (an example of this is described in more detail below).

As shown in this example, in some embodiments, the message (e.g., 502) (also) includes a header field (e.g., 503) and a payload (e.g., 506) and selecting the virtual queue (e.g., at step 102 in FIG. 1) is further based at least in part on one or more of the following: the header field or at least some part of the payload.

Figure 6:
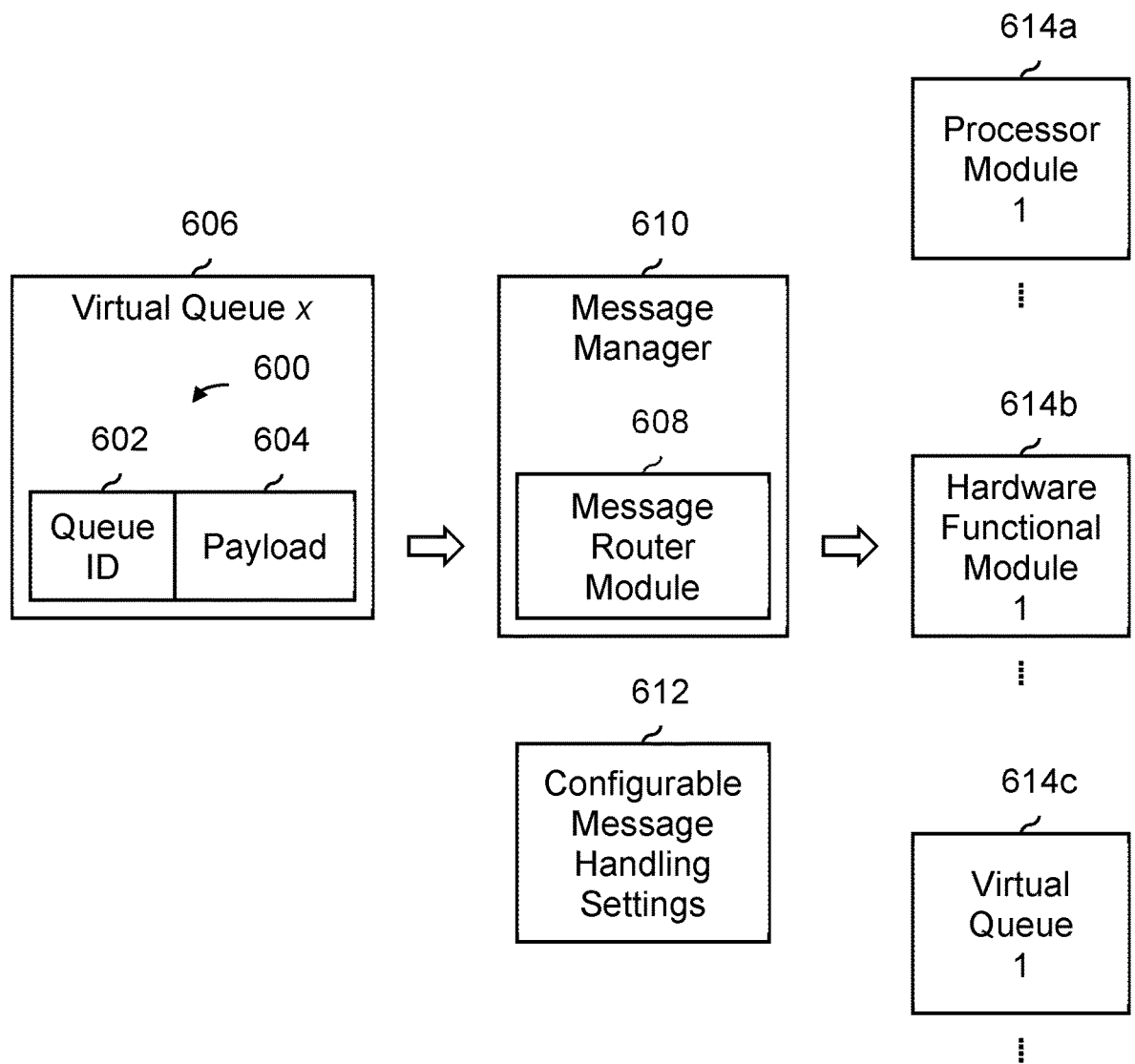
FIG. 6 is a diagram illustrating an embodiment of a message manager providing a message to a selected message recipient.

FIG. 6 is a diagram illustrating an embodiment of a message manager providing a message to a selected message recipient. In this example, a message (600) which includes a queue ID (602) and a payload (604) is stored in an $x^{th}$ virtual queue (606). For example, that virtual queue (606) may have been selected based at least in part on the queue ID (602), as described above. For brevity and to preserve the readability of the figure, other header fields in the message (600) are not shown in this diagram.

A message routing module (608) in the message manager (610) selects a message recipient (614b) from a plurality of potential message recipients (614a-614c) based at least in part on the configurable message handling settings (612). As shown in this example, the potential message recipients (614a-614c) can include a processor module (e.g., 614a), a hardware functional module (e.g., 614b), or a virtual queue (e.g., 614c). In one straightforward example, the configurable message handling settings (612) indicate that all messages stored in the $x^{th}$ virtual queue (606) are to be provided to some specified recipient (e.g., the first hardware functional module (614b)). In a more complex example, the configurable message handling settings (612) can include other information (e.g., the queue ID (602), some other header field (not shown here), or some portion of the payload (604), etc.) that is/are used to select the message recipient.

As shown here, with a virtual queue module (e.g., which acts as an isolation layer between processor modules and hardware functional modules), the SOC can be easily reconfigured and/or modified to change message forwarding and/or passing (e.g., by changing the configurable message handling settings (612) to change the selected or intended recipient (as an example)) from the first hardware functional module (614b) to the first processor module (614a), as or if needed.

For example, suppose the SOC is a storage controller SOC that is designed with a certain storage application and/or specific storage media in mind. Subsequently (e.g., after the design of the storage controller SOC has been frozen or finalized), a new storage application and/or new storage media emerges where backwards compatibility is desired but the functionality or operations supported by one of the hardware functional modules (e.g., 614b) is incompatible and/or insufficient. In this situation, the configurable message handling settings (612) can be changed so that messages originally intended for the (now insufficient) hardware functional module (e.g., 614b) are instead made available or otherwise provided to a processor module (e.g., 614a); updated firmware runs on that processor module and provides the new functionality or operations required by the new storage application and/or new storage media. This is much less expensive and time consuming than (for example) having to tape out new mask layers for a new SOC; even a metal-only change is relatively expensive and time consuming.

As shown in this example, in some embodiments, the plurality of potential message recipients further includes a second virtual queue (e.g., 614c) in the plurality of virtual queues; selecting the message recipient further includes selecting the second virtual queue; and providing the message to the selected message recipient further includes modifying the configurable message handling settings (e.g., 612) so that a storage location associated with the message is reassigned to the second virtual queue (e.g., so that the message does not have to be moved from one location to another within a shared queue structure, which may be more time consuming and/or resource intensive than simply changing the configurable message handling settings, which stores the sizes and/or locations of the various virtual queues).

Figure 7:
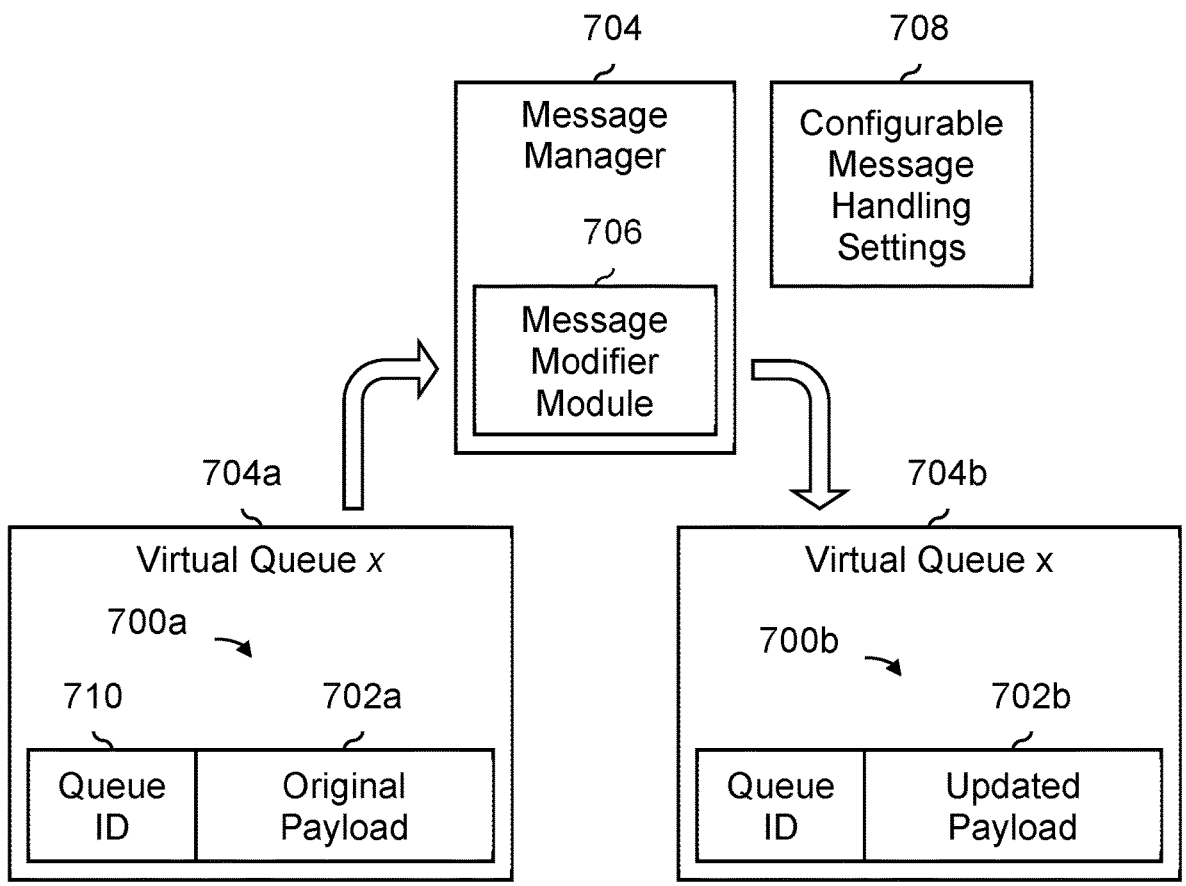
FIG. 7 is a diagram illustrating an embodiment of a message manager modifying a message.

FIG. 7 is a diagram illustrating an embodiment of a message manager modifying a message. In this example, an original message (700a), which includes an original payload (702a), is stored in a virtual queue (704a). The message manager (704) includes a message modifier module (706) that modifies the contents of the message (700a) according to the configurable message handling settings (708).

In this example (for simplicity and ease of explanation), the configurable message handling settings (708) specify a single type of change to all messages that are stored in the $x^{th}$ virtual queue (704a). For example, suppose the original payload (702a) includes status information (e.g., from the hardware functional module that generated the message) but the original payload includes the wrong status (e.g., from the wrong registers) due to a hardcoded error in that hardware functional module. The configurable message handling settings (708) specify the location or portion of the original payload (702a) to replace, as well as the location where the updated payload may be obtained from (e.g., the correct registers where the correct status information is obtained). The message modifier module (706) obtains the new information from the specification location (i.e., per the configurable message handling settings (708)) and includes this new information in the updated payload (702b) in the updated message (700b) which is still stored in the $x^{th}$ virtual queue (704b), at least in this example.

It is noted that the size of the updated payload (702b) does not necessarily match the size of the original payload (702a); in some embodiments, a length field (not shown) in the message is updated (if needed). Similarly, if the updated message is stored in a different virtual queue (e.g., virtual queue y), the queue ID value (e.g., 710) of the message may be modified from that of the original message.

In some embodiments, some (but not all) of the messages in a given virtual queue are modified (e.g., only certain types of messages contain an error that needs to be fixed). For example, the configurable message handling settings (708) may specify the parameters to identify which messages get modified (e.g., using the queue ID (710), some other header field (not shown), the virtual queue (e.g., 704a), etc.) versus those messages which are not modified.

By being able to make these changes via the configurable message handling settings (708), some (e.g., hardcoded) errors may be fixed by configuring the configurable message handling settings (708) to make the appropriate changes. This feature may also permit an existing SOC to be modified (e.g., simply, inexpensively, and/or quickly) to support new applications and/or new systems. To put it another way, the virtual queue module may eliminate the need to perform an expensive and time-consuming tape out of new mask layers and/or a metal-only fix (e.g., to fix hardcoded errors or add new support and/or interoperability) by instead only changing the programming and/or configuration of the SOC.

As shown in this example, in some embodiments, a virtual queue module is (further) configured to modify a message (e.g., 700a), based at least in part on the configurable message handling settings (e.g., 708), and providing the message to the selected message recipient includes providing the modified message (e.g., 700b). In some such embodiments, the configurable message handling settings include a content location; and modifying the message includes: accessing the content location to obtain new content; and including the new content in the modified message.

It may be helpful to describe a specific example application in which virtual queues are used. The following figure shows an example of a storage controller SOC that includes a virtual queue module.

Figure 8:
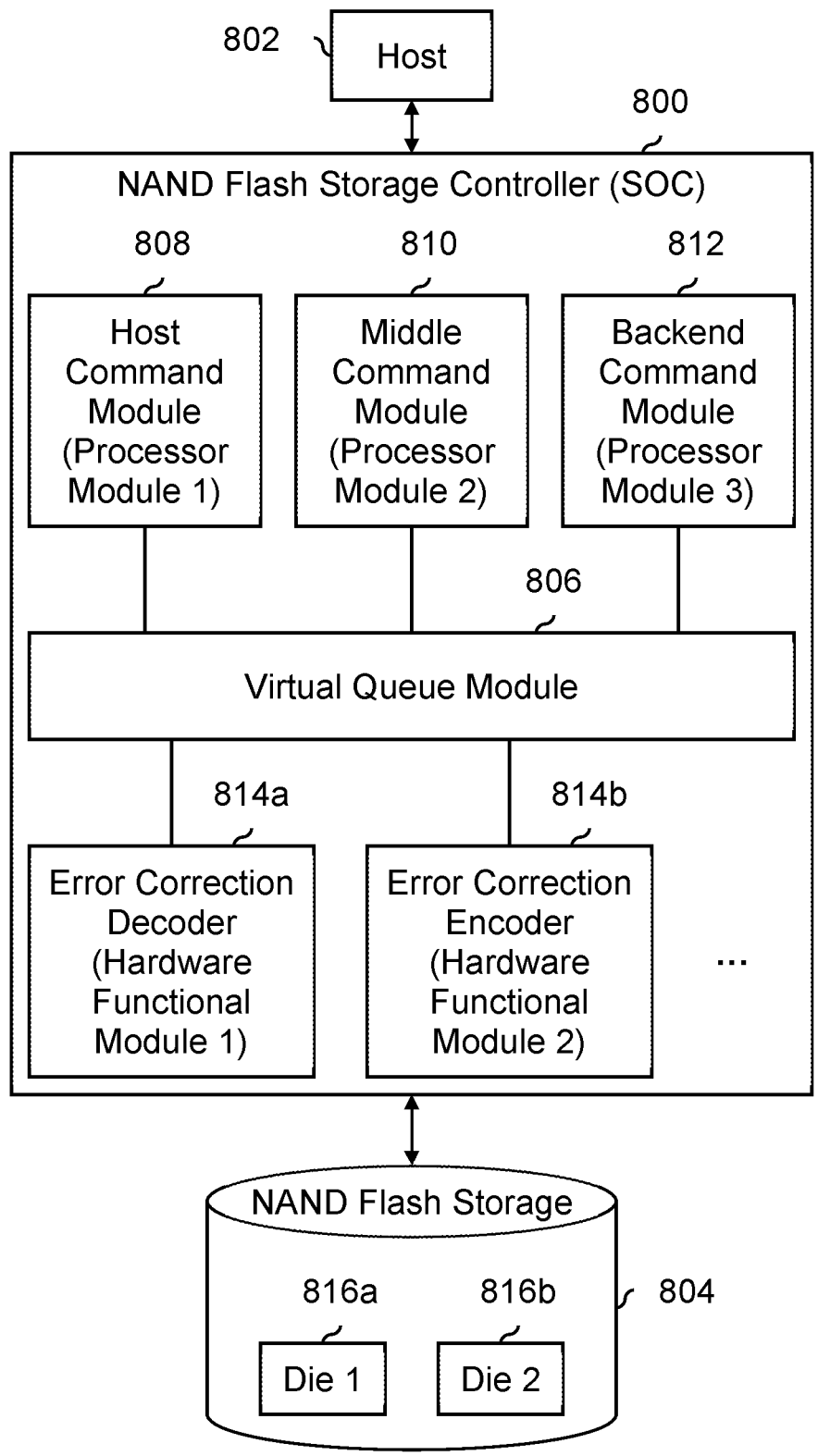
FIG. 8 is a diagram illustrating an embodiment of a NAND Flash storage controller that includes a virtual queue module.

FIG. 8 is a diagram illustrating an embodiment of a NAND Flash storage controller that includes a virtual queue module. In this example, a NAND Flash storage controller (800), implemented on an SOC, sits between a host (802) and NAND Flash storage (804) where the host (802) reads from and writes to the NAND Flash storage (804) using the NAND Flash storage controller (800).

In this example, the NAND Flash storage controller (800) includes three control and/or command modules that are implemented in firmware and run on respective processor modules: a host command module that runs on a first processor module (808), a middle command module that runs on a second processor module (810), and a backend command module that runs on a third processor module (812). The host command module (808) is responsible for managing communications with the host (802).

The middle command module (810) is responsible for operations internal to the NAND Flash storage controller (800) (e.g., decoupled from communication with the host (802) or NAND Flash storage (804)). For example, instructions from the host may refer to a logical address that is translated into a physical address; this is referred to as the flash translation layer (FTL); the middle command module (810) may perform or otherwise include FTL operations.

The backend command module (812) is responsible for communicating with the NAND Flash storage (804). In this example, the NAND Flash storage (804) includes multiple die (816a and 816b) and the backend command module (812) breaks up and regroups instructions and/or commands based on the die (e.g., 816a or 816b) so that each instruction or command is directed to a single die. This may be more efficient and/or permit the use of faster communication techniques (e.g., streams or bursts).

The NAND Flash storage controller (800) includes a virtual queue module (806) that acts as an isolation layer, as described above. For brevity and to preserve the readability of the figure, components or modules within the virtual queue module (806) are not shown in this diagram. The NAND Flash storage controller (800) also includes processor modules (808, 810, and 812) and hardware functional modules, including an error correction decoder (814a), such as a low-density parity-check (LDPC) decoder, which is used during a read of the NAND Flash storage (804), and an error correction encoder (814b), such as an Advanced Encryption Standard (AES) encryption module, which is used during a write to the NAND Flash storage (804). The data that is read back from the NAND Flash storage (804) may contain errors and/or noise and using an error correction code offers protection against such errors and/or noise.

There are a variety of storage applications which the exemplary NAND Flash storage controller (800) can be used in. Depending upon the storage application, the demands and/or load placed on the NAND Flash storage controller (800) will vary and the virtual queue module (806) may be configured in a manner that is more optimally suited to that application.

In some embodiments (e.g., where the SOC system includes a storage controller SOC which in turn includes an error correction decoder), the virtual queue module determines an error rate (e.g., an average error rate that is determined over some window and/or that is based at least in part on one or more decoding error metrics reported by the error correction decoder (814a)) and the virtual queue module is (further) configured to: determine an error rate based at least in part on one or more decoding error metrics reported by the error correction decoder; and in the event the error rate exceeds a threshold, modify the configurable message handling settings in order to increase the size of a virtual queue that inputs to the error correction decoder.

For example, as described above, if or when the error rate increases substantially, a virtual queue that is upstream of and/or feeds into the error correction decoder may contain more messages (e.g., and therefore may need to be increased in size to prevent an overflow) since the error correction decoder is taking longer to decode the more error-filled read data. If desired, a virtual queue that is downstream from and/or is at the output of the error correction decoder may contain fewer messages (e.g., and therefore may be decreased in size without affecting performance and/or for more efficient utilization of the virtual queues, if desired).

In another example storage application, the NAND Flash storage controller (800) is used in a data center application where the storage medium (804) is divided into logical regions (e.g., fragments) by the host (802). The storage controller design (at least in this example) is simplified by decoupling the media side operations (e.g., managed by and/or associated with backend command module (812)) from the logical fragmentation on the host side (e.g., managed by and/or associated with host command module (808)). As messages are issued from the media-side hardware functional modules to the host-side functional modules, the configurable message handling is used to insert the defragmentation data into the messages as they move through the virtual queue module.

In another example storage application, the virtual queues (e.g., in virtual queue module (806)) used in an automated retry operation. For example, when a Flash interface hardware functional module cannot complete the requested operation (e.g., a read operation, a write operation, etc.) because the target media die (e.g., 816a or 816b) is busy, the Flash interface hardware functional module uses a flag in the payload of the status message to resend the original command to the original command virtual queue instead of sending the status message to a virtual queue used by the associated processor module (e.g., backend command module (812)).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A storage controller system implemented on a System On Chip (SOC), comprising:
a host command module that:
manages communication between the storage controller system and a host; and
runs on a first processor module;
a backend command module, wherein:
the backend command module manages communication between the storage controller system and a storage system via a storage interface;
the backend command module runs on a second processor module; and
the host uses the storage controller system to store data in the storage system;
a storage interface hardware functional module that:
in response to an unsuccessful operation directed to the storage system, generates a first type of a status message that includes an automated retry flag in a payload section of the status message set to TRUE; and
in response to a successful operation directed to the storage system, generates a second type of the status message that includes: (1) the automated retry flag set to FALSE and (2) a queue identifier (ID) set to a value associated with the backend command module; and
a virtual queue module that:
receives, from the storage interface hardware functional module, the status message;
selects a virtual queue, from a plurality of virtual queues in a shared queue structure, based at least in part on one or more configurable message handling settings, including by:
in response to (1) the automated retry flag being set to TRUE and (2) independent of the queue ID, selecting an original command virtual queue associated with the unsuccessful operation; and
in response to (1) the automated retry flag being set to FALSE and (2) the queue ID being set to the value associated with the backend command module, selecting a virtual queue associated with the backend command module;
stores a message in the selected virtual queue, including by:
in response to (1) the automated retry flag being set to TRUE and (2) independent of the queue ID, storing a copy of an original command associated with the unsuccessful operation in the original command virtual queue; and
in response to (1) the automated retry flag being set to FALSE and (2) the queue ID being set to the value associated with the backend command module, storing the second type of the status message in the virtual queue associated with the backend command module;
selects a message recipient from a plurality of potential message recipients based at least in part on the one or more configurable message handling settings, wherein the plurality of potential message recipients includes the host command module, the backend command module, and the storage interface hardware functional module; and
provides the stored message in the selected virtual queue to the selected message recipient.

2. The storage controller system implemented on the SOC recited in claim 1, wherein:
the storage interface includes a Flash interface; and
the storage interface hardware functional module includes a Flash interface hardware functional module.

3. The storage controller system implemented on the SOC recited in claim 1, wherein:
the storage system includes a plurality of storage media die, including a first storage media die that is busy and a second storage media die that is available;
the unsuccessful operation directed to the storage system is directed to the first storage media die that is busy; and
the successful operation directed to the storage system is directed to the second storage media die that is available.

4. A method for managing a storage controller system implemented on a System On Chip (SOC), comprising:
using a host command module, in the storage controller system implemented on the SOC, to:
manage communication between the storage controller system and a host; and
run on a first processor module;
using a backend command module, in the storage controller system implemented on the SOC, to manage communication between the storage controller system and a storage system via a storage interface, wherein:

the backend command module runs on a second processor module; and the host uses the storage controller system to store data in the storage system;

using a storage interface hardware functional module, in the storage controller system implemented on the SOC, to:

in response to an unsuccessful operation directed to the storage system, generate a first type of a status message that includes an automated retry flag in a payload section of the status message set to TRUE; and in response to a successful operation directed to the storage system, generate a second type of the status message that includes: (1) the automated retry flag set to FALSE and (2) a queue identifier (ID) set to a value associated with the backend command module; and using a virtual queue module, in the storage controller system implemented on the SOC, to:

receive, from the storage interface hardware functional module, the status message;

select a virtual queue, from a plurality of virtual queues in a shared queue structure, based at least in part on one or more configurable message handling settings, including by:

in response to (1) the automated retry flag being set to TRUE and (2) independent of the queue ID, selecting an original command virtual queue associated with the unsuccessful operation; and in response to (1) the automated retry flag being set to FALSE and (2) the queue ID being set to the value associated with the backend command module, selecting a virtual queue associated with the backend command module;

store a message in the selected virtual queue, including by:

in response to (1) the automated retry flag being set to TRUE and (2) independent of the queue ID, storing a copy of an original command associated with the unsuccessful operation in the original command virtual queue; and in response to (1) the automated retry flag being set to FALSE and (2) the queue ID being set to the value associated with the backend command module, storing the second type of the status message in the virtual queue associated with the backend command module;

select a message recipient from a plurality of potential message recipients based at least in part on the one or more configurable message handling settings, wherein the plurality of potential message recipients includes the host command module, the backend command module, and the storage interface hardware functional module; and provide the stored message in the selected virtual queue to the selected message recipient.

5. The method recited in claim 4, wherein:
the storage interface includes a Flash interface; and
the storage interface hardware functional module includes a Flash interface hardware functional module.

6. The method recited in claim 4, wherein:
the storage system includes a plurality of storage media die, including a first storage media die that is busy and a second storage media die that is available;
the unsuccessful operation directed to the storage system is directed to the first storage media die that is busy; and
the successful operation directed to the storage system is directed to the second storage media die that is available.

* * * * *